Figure 5:
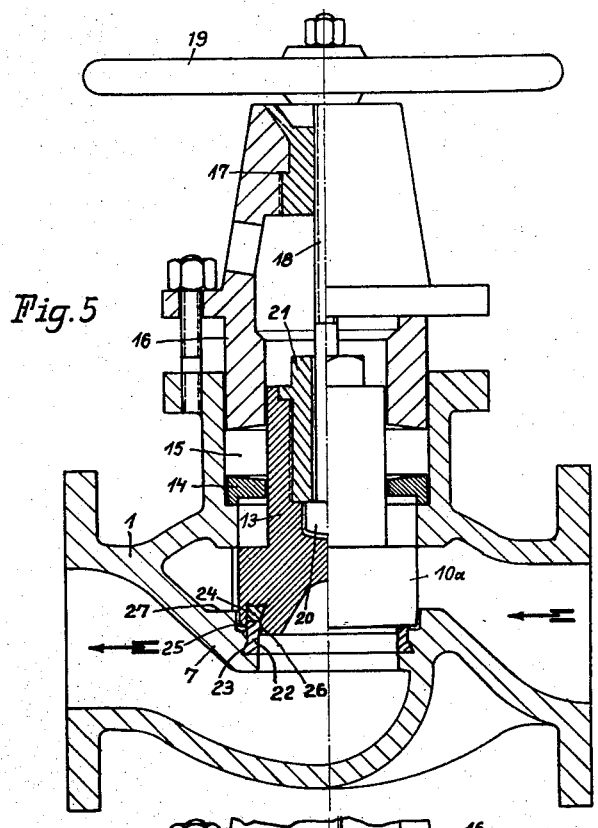

Aug. 17, 1937.    J. ZAGORSKI    2,090,381
VALVE
Filed Nov. 25, 1931    2 Sheets-Sheet 1
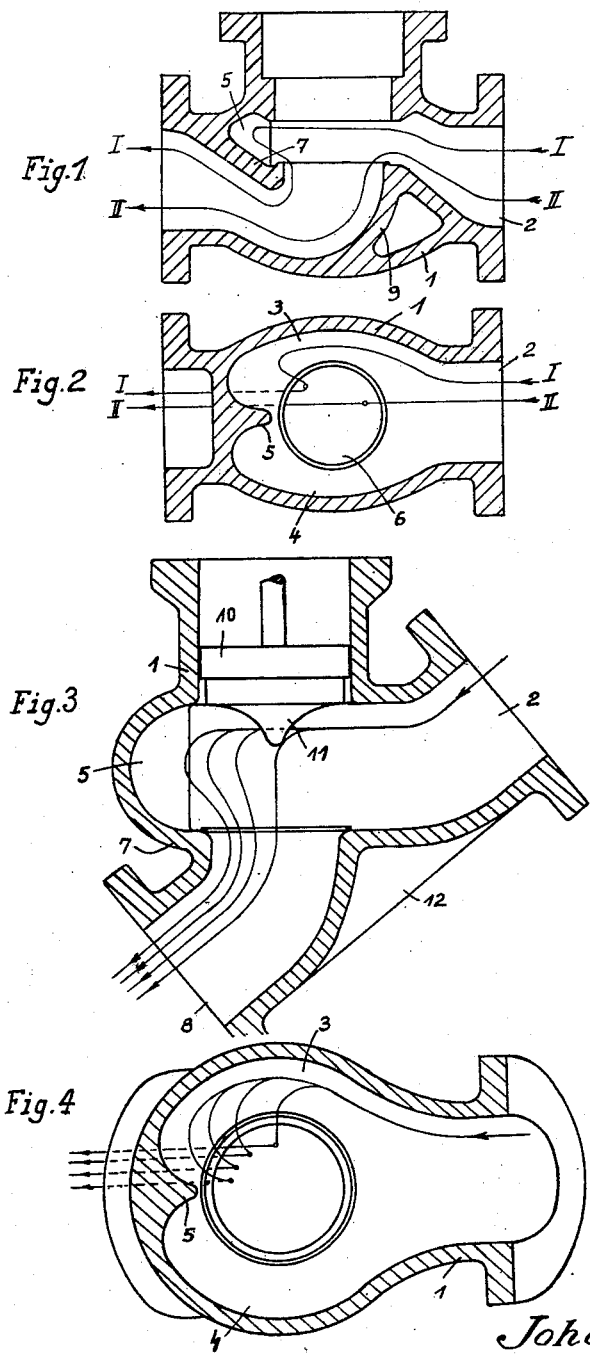
Inventor:
Johann Zagorski
by B. Singer
his Attorney Aug. 17, 1937.  J. ZAGORSKI  2,090,381
VALVE
Filed Nov. 25, 1931  2 Sheets-Sheet 2

Inventor:
Johann Zagorski
by B. Singer
his Attorney

Patented Aug. 17, 1937

2,090,381

UNITED STATES PATENT OFFICE 2,090,381

VALVE

Johann Zagorski, Berlin, Germany

Application November 25, 1931, Serial No. 577,349
In Germany November 25, 1930

6 Claims. (Cl. 251—155)

The invention concerns valves having special adaptation for handling steam or gaseous or liquid fluids under high pressure and high temperatures and for conserving absolute tightness even when constructed with large dimensions and when subjected to severe conditions of use.

The essential features consist in shaping the fluid guiding members of the valve as nearly as possible according to smooth streamline shapes for avoiding whirling and throttling of the fluid which especially in the case of high pressures of hundred atmospheres and more and of high temperatures up to five hundred degrees Celsius would have detrimental effects, this the more as in high pressure valves the passages must be made relatively small. Further essential features consist in balancing the movable valve member by a balancing or differential piston, for making the valve handy also with high pressures.

Several embodiments of the invention are shown in the drawings in which

Figure 6:
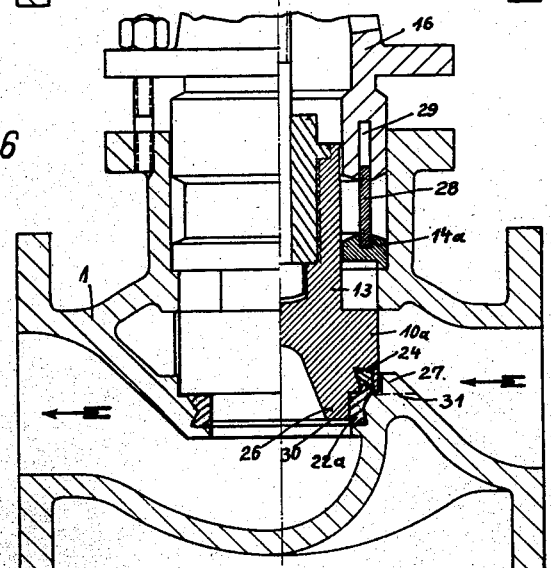

Figs. 1 and 2 are a vertical and a horizontal section of a streamlined valve body, Figs. 3 and 4 are a vertical and a horizontal section of a modified form of a valve body, Fig. 5 is a section of a complete valve having a differential piston, a stuffing box and a plastic metal seat, and Fig. 6 is a section of a modified form of said valve.

According to Figs. 1 and 2, a valve body 1 has an entrance 2 and entering channels 3, 4 formed similar to a torse, i. e. with an essential annular general shape and at least partly circular cross-sections. Said channels end on a guiding projection 5 which leads the entering fluid into the valve passage 6 provided in a usual diaphragm 7, along smooth lines I—I without whirling movements, other portions of the fluid streaming along similarly smooth lines II—II. The passage cross sections may be so dimensioned that they diminish from the entrance towards said projection 5 so as to be zero at the latter according to the amount of fluid decreasing on the way by entering successively into the valve diaphragm passage 6. The outlet 8 is connected to the lower side of said diaphragm 7 by a streamlined channel portion 9.

According to Figs. 3 and 4, the entrance 2 and outlet 8 are arranged on a straight line, obliquely to which the diaphragm 7 is arranged. The entering channel 3, 4 and projection 5 are constructed as in Figs. 1 and 2. The movable valve member consists in a poppet valve 10 having a cone 11 for better guiding the fluid on its spiral path. The curvatures of the entrance and outlet channels are very small so as to further diminish the stream resistances. A stiffening rib 12 makes the entire valve body sufficiently rigid.

Either of the described valve body constructions may be used for all following constructions with special advantage, as the streams are most favorable for moving around circular balancing pistons with the least noxious resistance.

According to Fig. 5, the movable member of the valve consists in a seating piston 10a made in one piece with a balancing piston 13 of smaller diameter than the first piston, so as to form a differential piston 10a, 13. In the example shown, the area of the cross section of the balancing piston 13 covers nearly one-half of the entire area of the seating piston 10a. Therefore, when the valve is closed, the fluid acts only on the half area of the seating piston 10a. On the other hand, when the valve is opened, the fluid acts from below on the total piston 10a and from top only on its annular portion projecting beyond the periphery of the piston 13, so that again half the axial force acting on the piston is balanced. The larger the piston 13 is, the larger is the percentage of balancing in case of opening the valve and the smaller in case of closing the valve, and inversely.

The packing 15 in Figs. 5 and 6 must be tight so that the pressure of the fluid cannot go over the piston 13. In this way, upon opening of the piston 13, there is no load applied on the piston from above through the pressure of the fluid, but only upon the rim of the piston 10a projecting beyond the piston 13. The surface of this projecting rim of the piston 10a is about half as great as the total cross-section of the piston 10a, and the piston 10a is accordingly relieved of load to about 50% upon opening.

If the valve is opened, the piston 10a is completely under load from below by the medium; from above, on the contrary, only about one-half, namely, only up to the side walls of the piston 13. In view of this, the piston 10a is again relieved of load to about 50%. The condition for this method of operation is, of course, that the flow of the medium takes place only from above. For tightening said balancing piston, a stuffing box is provided in the valve body 1, consisting of a base ring 14, a packing 15 of asbestos or other compressible material, and a valve body head 16. The base ring 14 is exposed on its lower side to the fluid pressure for being automatically pressed against the packing so as to better tighten the latter. The seating piston 10a is so long that in full open position of the valve it presses against said base ring 14 for attaining absolute tightness of the packing. The valve body head 16 contains a screw nut 17 and a threaded spindle 18 with a hand wheel 19 for moving the differential piston 10a, 13, said spindle 18 ending in a collar 20 loosely enclosed in said piston 13 by aid of a sleeve 21 screwed into said piston. Said loose connection makes the piston free from the rotation and the guiding effect of the spindle, so that it moves only axially and without jamming in the stuffing box. The valve body 1 has channels 3, 4 above the valve passage as shown in Fig. 2.

The seats of this valve are constructed as follows. A seat ring 22 of hard special steel, such as nickel-chrome-steel is inserted in the diaphragm 7 and held in the latter by an enlarged portion 23 which is produced by making the inner face of said ring narrower on its lower portion than on its upper portion, mounting the ring in the diaphragm and pressing a thorn through it so that the material of the ring is forced into the enlarged portion 23. A second seat ring 24 is embedded in an undercut groove of the seat piston 10a and consists of a metal conserving the technological state of plasticity up to temperatures of about 500° C., for instance electrolytically produced copper tempered by glowing, or iron, nickel, silver in similar plastic state, or also plastic alloys containing the said metals, or Monel-metal.

This seat arrangement gives an absolute tightness even if by heat expansion the valve parts are somewhat deformed, so that the piston 10a, 13 is somewhat tilted, as the plastic metal applies itself to the steel ring 22. The merely axial approachment of the piston avoids grinding on said plastic ring, which would roughen its surface. The projecting edges 25, 26 avoid undesired deformations of the plastic ring and at once protect it against the streaming fluid as they form a dead space between themselves. The inner edge 26 projects especially far, so that in small opening positions of the valve the narrowest passage exists between said edge 26 and the steel ring 22, and thereby the highest stream speed arises in this throttling cross section but not on the plastic ring which otherwise could be damaged by so called wire drawing. A further throttling ring 27 of quite similar action is provided on the diaphragm 7 so as to form a second throttling passage in cooperation with the other receiving groove edge 25. This relieves the first throttling passage and thereby the steel ring from a part of the throttling work.

According to Fig. 6, the entire valve corresponds to the last mentioned with the following exceptions. In the stuffing box, a sleeve 28 is fastened in the base ring 14a and extends into an annular slot 29 of the valve body head 16 for subdividing the packing which has a rather large radial dimension corresponding to the difference of the diameters of the differential piston 10a, 13. This ensures better tightness as well on the piston 13 as on the valve body 1. In the valve seats, the steel seat 22a has a projection 30 for cooperation with the inner throttling edge 26, and thereby its face contacting the plastic metal ring 24 is elongated from the throttling passage and relieved from the throttling work. In consequence, the second throttling ring 27 may here be omitted as indicated by the dotted line 31 as the means 26, 30 does its work for a long time without any damage to the seats. The valve body 1 has channels 3, 4 above the valve passage as shown in Fig. 2.

I claim:

1. A valve body provided with an inlet and an outlet, a diaphragm between said inlet and outlet, the diaphragm being provided with a circular aperture, the body having a passage extending from said inlet to said aperture and partly around the same in a curve, said passage connecting with said aperture along its entire circumference, the height of that portion of the passage extending around the aperture being uniform at all points and being sufficiently great to permit the fluid to enter said circular aperture from any point of the curved portion of the passage in substantially radial direction, and a centrally disposed streamlined projection on the wall of that portion of the passage surrounding said circular aperture, said streamlined projection extending toward the inlet of said passage and subdividing said passage into two lateral channel portions partially surrounding said circular aperture symmetrically, the body being provided also with a tubular passage below said diaphragm of substantially the same cross sectional area as said aperture, said tubular passage connecting the lower side of said aperture directly with said outlet.

2. A valve comprising a valve body, a diaphragm in said body, provided with a passage, a movable member for closing said passage from above, a main channel adapted to serve as an entrance to or outlet from said body and extending partly around the upper end of said passage in the shape of a curved channel of uniform height, and a centrally disposed streamlined projection arranged in the body oppositely to the outer end of said main channel and forming two lateral channel portions partially surrounding said passage symmetrically thereto.

3. A valve as claimed in claim 2, wherein a second channel adapted to serve as an outlet from or entrance to the valve body is formed as a direct continuation of the lower end of the diaphragm passage, said second channel being curved so as to have its outer end essentially in axial alinement with the outer end of said main channel.

4. A valve as claimed in claim 2, wherein the inner portion of the main channel which surrounds the upper end of said passage is inclined upwardly with respect to the outer end portion of said main channel.

5. A valve as claimed in claim 2, wherein the movable member consists of an at least partially balancing piston sliding in a cylindrical valve body portion which forms a continuation of the surrounding main channel portion concentrically to the diaphragm passage.

6. A valve as claimed in claim 2, wherein the lower face of the movable member is provided with a cone-shaped projection which forms a continuation of the surrounding main channel faces, when the valve is in full open position.

JOHANN ZAGORSKI.